Dec. 31, 1929. A. O. APPELBERG 1,741,601
THERMOSTATIC MAKE AND BREAK SWITCH
Filed July 3, 1924
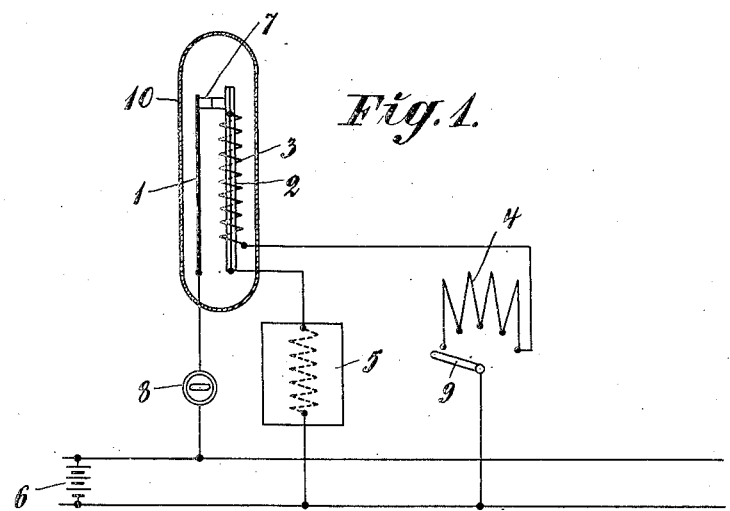
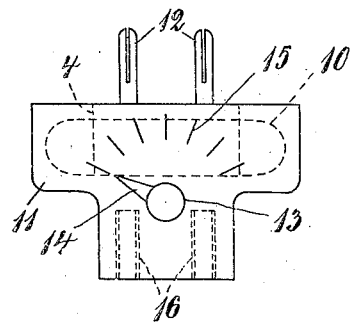 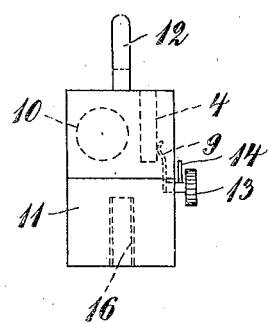

Patented Dec. 31, 1929

1,741,601

UNITED STATES PATENT OFFICE

AXEL OSVALD APPELBERG, OF STOCKHOLM, SWEDEN, ASSIGNOR TO AKTIEBOLAGET BIRKA REGULATOR, OF STOCKHOLM, SWEDEN, A COMPANY OF SWEDEN

THERMOSTATIC MAKE AND BREAK SWITCH

Application filed July 3, 1924, Serial No. 724,173, and in Germany September 8, 1923.

The invention relates to a device for controlling electrical circuits by means of a thermostatic make and break switch in connection with means for varying the frequency of the make and break periods or the ratio between the durations of said periods respectively. According to this invention the operation of the thermostatic switch is controlled by means of an adjustable resistance inserted in the heating circuit of said switch.

The invention is particularly intended for use in connection with electrical heat producing apparatus for regulating the supply of energy, the thermostatic switch being then arranged to make and break the heating circuit of the apparatus. As the amount of energy thus supplied to the apparatus is proportionate to the duration and frequency of the periods during which the heating circuit of the apparatus is closed, a regulation of said energy may evidently be obtained in accordance with this invention by regulating the heating circuit of the thermostatic switch by means of a variable resistance included in the circuit last mentioned such regulation resulting in a variation of the frequency of operation of the thermostatic switch. Compared with the ordinary mode of regulation by means of a variable resistance inserted directly into the main circuit of the apparatus the present invention offers the same advantages as to the possibility of obtaining any wanted degree of regulation but in addition thereto a regulating device according to the invention has the advantage that the amount of energy consumed in the regulating resistance is very small and, in all events, independent of the strength of the current of the main circuit to be controlled, whereas the ordinary mode of regulation always involves a considerable loss of energy which stands in an inverse proportion to the useful energy.

The invention will be more closely described with reference to the accompanying drawing, in which Fig. 1 diagrammatically illustrates the arrangement of the circuits and apparatus, while Fig. 2 and Fig. 3 are different elevations of a wall plug, the casing of which contains the regulating resistance and the thermostatic switch.

Referring to Fig. 1 the thermostatic switch comprises two contact stems 1, 2 one of which consists of a bimetallic strip 2 surrounded by a heating winding 3 which is electrically connected with the strip 2 on the one side and with the regulating resistance 4 on the other hand. The main circuit contains a current consuming apparatus, for instance an electrical heating apparatus 5, which is connected with the source of current 6 over the contact 7 of the thermostatic switch and a turn type installation switch 8. The heating circuit of the thermostatic switch forms a branch circuit connected in parallel to the heating apparatus 5, said heating circuit being likewise controlled by the thermostatic switch and, in addition thereto, adapted to be regulated by setting the regulating lever 9 of the resistance 4.

On closing the switch 8, while the regulating resistance 4 is cut off, the heating apparatus 5 will receive an uninterrupted current over the contact 7 of the thermostat, said contact being normally closed. If it is required to regulate the amount of energy supplied to the heating apparatus, the regulating resistance 4 is switched in to a corresponding extent. The thermostatic switch is then energized so as to produce a periodically repeated breaking and closing of the main current circuit as well as of the heating circuit of the thermostat. The heating apparatus will thus be supplied with an intermitting current, the amount of energy supplied being obviously dependent upon the operating frequency of the thermostatic switch and on the ratio between the durations of the make and break periods. An increase of current in the heating circuit of the switch, while maintaining the conditions unaltered in other respects, will reduce the operating frequency of the switch, at the same time causing the ratio between the durations of the make and break periods to be augmented, both said facts contributing to a reduction of the energy supplied to the heating apparatus 5. Consequently, by gradually cutting out the regulating resistance 4 the energy supplied will be gradually reduced.

It should be observed that the energy losses caused by the said regulating operation are limited to the consumption of current in the heating circuit of the thermostat, said losses being comparatively small, as a thermostatic switch may be actuated by a very small amount of energy, usually only a few watts. Particularly, the amount of energy required for the actuation of the regulating device is very small in the case of using a bimetallic thermostat and may be still further reduced by enclosing the thermostatic switch with its heating winding in an evacuated receptacle, as shown in Fig. 1, the vacuum then acting as a heat insulation so as to reduce the loss of energy due to heat being carried off. At the same time the thermostat is rendered more sensitive and, accordingly, will break the current more quickly, this effect in turn changing the proportion between the make and break periods in a manner which may be utilized with advantage in certain applications of the invention.

An essential feature of the invention consists in this that the main current circuit and the heating circuit form separate circuits, the breaking contact 7 being the only common part of said circuits. By this arrangement it is attained that the amount of energy required for the regulating operation is independent of the magnitude of the energy consumed in the main current circuit and, accordingly, it may always be kept at the lowest possible value.

In the arrangement described above the regulating resistance 4 serves at the same time as a protecting device acting to prevent discharges which might otherwise occur between the coil 3 and the contact strip 1 owing to the rise of potential caused by the breaking of current at contact 7. This protecting effect is due to the fact that a part of the energy is absorbed at the breaking moment by the regulating resistance, the occurrence of detrimental excess voltages within the receptacle 10 being thereby prevented.

The different parts of the regulating device may preferably be combined constructively with the switch member by means of which the current consuming apparatus 5 is connected to the source of current. A such arrangement is illustrated by way of example in Fig. 2 and Fig. 3, in which the switch member consists of a wall plug 11. In this embodiment the receptacle 10 and the regulating resistance 4, 9 are enclosed within the casing of the wall plug, the receptacle 10 being preferably disposed perpendicularly to the contact pins 12. The regulating lever 9 of the resistance is adapted to be operated by means of a knob 13 which is attached to the pivot pin of said lever and which is provided with a pointer 14 adjustable on a scale 15. The wall plug may be connected directly to the leads of the apparatus or it may be adapted for connection to any desired circuit, being provided for this purpose, as shown on the drawing, with contact bushes 16 in which another contact plug may be inserted. The connection between the switch, the regulating resistance, the contact pins 12 and the contact bushes 16 may be realized in a manner analogous to that shown in Fig. 1. Accordingly, the contact 7 of the switch is interconnected between one of the contact bushes 16 and the corresponding contact pin 12, while the other contact bush is directly connected with the corresponding contact pin.

The switch member may also be in the form of a screw plug or the like adapted to be screwed into an ordinary lamp socket, the contact pins 12 being then replaced by contacts suited for instance for an Edison screw holder.

I claim:

1. An electrical regulating system comprising a main circuit, a thermostatic make-and-break switch included in said circuit so as to produce an intermittent supply of energy, a heating resistance arranged in thermal relation with the switch and connected in circuit over a make-and-break contact of the switch, said switch and resistance being enclosed in an evacuated receptacle, and a variable regulating resistance adapted for regulating the supply of energy to said heating resistance and included in a circuit branched off from the main circuit.

2. A regulating device for electrical heat producing apparatus, comprising a thermostatic switch adapted to make and break the circuit of the heat producing apparatus, a heating resistance arranged together with the switch in an evacuated receptacle in thermal relation with said switch and arranged to be connected in circuit over the make-and-break contact of said switch, and a variable regulating resistance arranged in a branch circuit for regulating the supply of energy to said heating resistance by changing the make-and-break period of the switch.

3. An electrical regulating system comprising a main circuit, a thermostatic make-and-break switch included in said circuit so as to produce an intermittent supply of energy, a sealed receptacle enclosing said switch, a heating resistance arranged in thermal relation with the switch and connected in circuit over a make-and-break contact of the switch and a variable regulating resistance adapted for regulating the supply of energy to said heating resistance and included in a circuit branched off from the main circuit.

4. A regulating device for electrical heat producing apparatus, comprising a thermostatic switch adapted to make and break the circuit of the heat producing apparatus, a sealed receptacle enclosing said switch, a heating resistance arranged in thermal relation with said switch and adapted to be connected in circuit over the make-and-break contact of said switch, and a variable regulating resistance arranged in a branch circuit for regulating the supply of energy to said heating resistance by changing the make-and-break period of the switch.

5. A self-contained regulating set consisting of a wall plug having mounted therein a sealed receptacle enclosing a thermostatic make-and-break switch provided with a heating resistance and a variable regulating resistance for regulating the supply of energy to said heating resistance, plug switch terminals for connecting the set to a current supply main, other plug switch terminals for connecting the set to the electrical apparatus to be regulated, and leads connecting said terminals, the thermostatic switch being included in one of said leads.

In testimony whereof I affix my signature.

AXEL OSVALD APPELBERG.